United States Patent
Goenka et al.

(10) Patent No.: US 9,865,261 B2
(45) Date of Patent: Jan. 9, 2018

(54) WEBPAGE NAVIGATION UTILIZING AUDIO COMMANDS

(71) Applicant: Yahoo!, Inc., Sunnyvale, CA (US)

(72) Inventors: Mohit Goenka, Santa Clara, CA (US); Stephani Bishop, San Jose, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

(21) Appl. No.: 14/872,224

(22) Filed: Oct. 1, 2015

(65) Prior Publication Data
US 2017/0098448 A1   Apr. 6, 2017

(51) Int. Cl.
| | | |
|---|---|---|
| *G10L 15/00* | (2013.01) | |
| *G10L 15/26* | (2006.01) | |
| *G10L 15/30* | (2013.01) | |
| *G06F 17/27* | (2006.01) | |
| *G06F 3/16* | (2006.01) | |
| *G10L 15/22* | (2006.01) | |

(52) U.S. Cl.
CPC ............ *G10L 15/265* (2013.01); *G06F 3/167* (2013.01); *G06F 17/2735* (2013.01); *G10L 15/30* (2013.01); *G10L 2015/223* (2013.01)

(58) Field of Classification Search
USPC ......................... 704/235, 246, 247, 251, 252
See application file for complete search history.

(56) References Cited

U.S. PATENT DOCUMENTS

| | | | | |
|---|---|---|---|---|
| 7,660,400 B2 * | 2/2010 | Bangalore | ........ | G06Q 10/06311 379/218.01 |
| 9,129,011 B2 * | 9/2015 | Yang | .................... | H04M 3/4938 |
| 9,288,321 B2 * | 3/2016 | Pujari | .................. | H04M 3/4938 |
| 2010/0058204 A1 * | 3/2010 | Wilson | .............. | G06F 17/30867 715/760 |
| 2010/0105364 A1 * | 4/2010 | Yang | .................... | H04M 3/4938 455/414.1 |
| 2012/0221331 A1 * | 8/2012 | Bangalore | ........ | G06Q 10/06311 704/235 |
| 2013/0275132 A1 * | 10/2013 | Bangalore | ........ | G06Q 10/06311 704/235 |
| 2014/0032468 A1 * | 1/2014 | Anandaraj | ............. | G06Q 30/02 706/46 |
| 2015/0143241 A1 * | 5/2015 | Zeigler | .................... | G06F 3/167 715/728 |
| 2015/0255086 A1 * | 9/2015 | Pujari | .................. | H04M 3/4938 704/270.1 |

* cited by examiner

*Primary Examiner* — Leonard Saint Cyr
(74) *Attorney, Agent, or Firm* — Cooper Legal Group, LLC (57) ABSTRACT

As provided herein, an audio signal (e.g., a user's spoken statement "check email") may be received from the user of a client device accessing a webpage (e.g., a webmail webpage) utilizing a browser. The webpage may be parsed, analyzed, and/or mapped to identify one or more elements on the webpage (e.g., a send/receive email user interface element). The audio signal may be evaluated relative to the one or more elements on the webpage (e.g., such as by a dictionary comprising one or more audio signals paired to one or more audio commands) to identify an audio command. The audio command may be transformed into a text command (e.g., a script corresponding to a script action that invokes the send/receive email user interface element). The text command may be utilized to invoke an event (e.g., send/receive email) corresponding to an element on the webpage.

20 Claims, 8 Drawing Sheets

WEBPAGE NAVIGATION UTILIZING AUDIO COMMANDS

BACKGROUND

A user may desire to navigate through one or more elements of a webpage (e.g., a checkout element of a shopping webpage, a toggle element to toggle between merchandise descriptions, a drafting element to write an email to a shopping company providing the shopping webpage, etc.) without utilizing a mouse and/or a keypad. However, many computing devices, operating systems, browsers, and/or websites may merely support navigation of a webpage through mouse input, keypad input, and/or other physical types of input. Unfortunately, impaired users (e.g., users having arthritis, a broken hand/arm, visual imparity, etc.) may be unable to utilize the mouse and/or the keypad for interacting with the webpage, and thus may forgo accessing the webpage.

SUMMARY

In accordance with the present disclosure, one or more client devices, systems, and/or methods for webpage navigation utilizing audio signals are provided. In an example, an audio signal may be received from a user of a client device accessing a webpage utilizing a browser (e.g., the audio signal may be received utilizing a browser speech recognizer). The audio signal may be evaluated in a context of the webpage to identify an audio command. In an example where the audio signal comprises "contact Dave," a new webmail message addressed to Dave may be presented to the user based upon the webpage comprising a webmail webpage. In another example, a cellular call to Dave may be placed based upon the webpage comprising a web based cellular service.

A dictionary may be generated to map the audio signal to the audio command. The dictionary may comprise a webmail dictionary based upon the webpage comprising the webmail webpage, a shopping dictionary based upon the webpage comprising a shopping webpage, a social media dictionary based upon the webpage comprising a social media webpage, etc. A map (e.g., a document object model (DOM) map) of the webpage, comprising an element of the webpage, may be generated before the webpage is rendered, while the webpage is being rendered, or after the webpage is rendered. The map of the webpage may be generated utilizing an accessibility tag (e.g., an accessibility initiative-accessible rich internet applications (WAI-ARIA) tag) associated with the webpage. An extension dictionary, of the dictionary, may be generated utilizing the map (e.g., for a non-generic element of the webpage, such as a name of a news story on a news webpage). The extension dictionary may comprise a translation of a first audio signal into a first audio command. The first audio command may correspond to the non-generic element of the webpage (e.g., such as a first element specific to the webpage).

The dictionary may be generated by identifying the element on the webpage, identifying the audio signal corresponding to the element, and pairing the audio signal to the audio command. The audio command may be transformed into a text command. The text command may be utilized to invoke an event (e.g., a navigation event, an email composition event, an invoke functionality event for the webpage, etc). The text command may comprise a script (e.g., a Java script). The script may be invoked to perform a script action in the context of the webpage.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
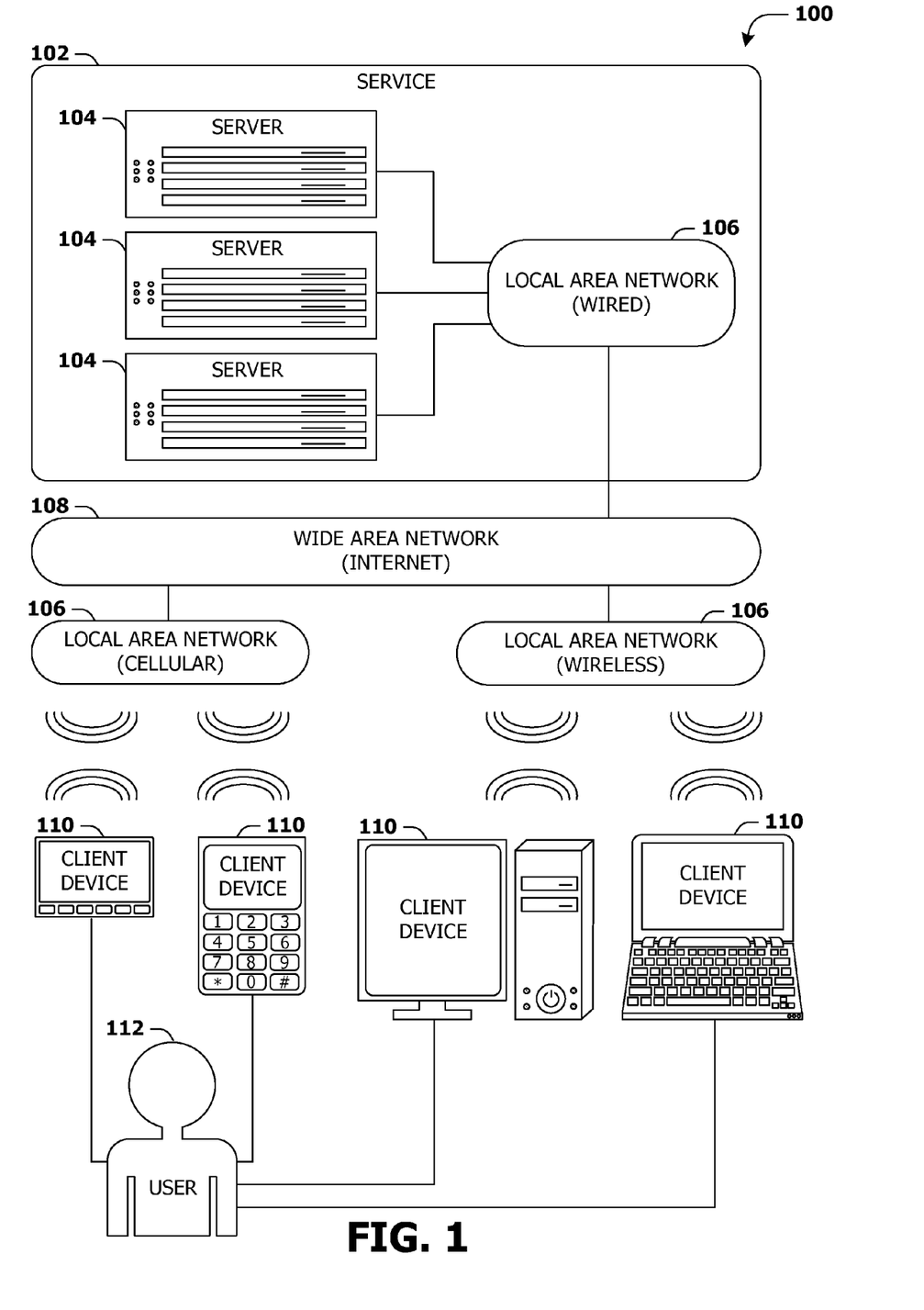
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
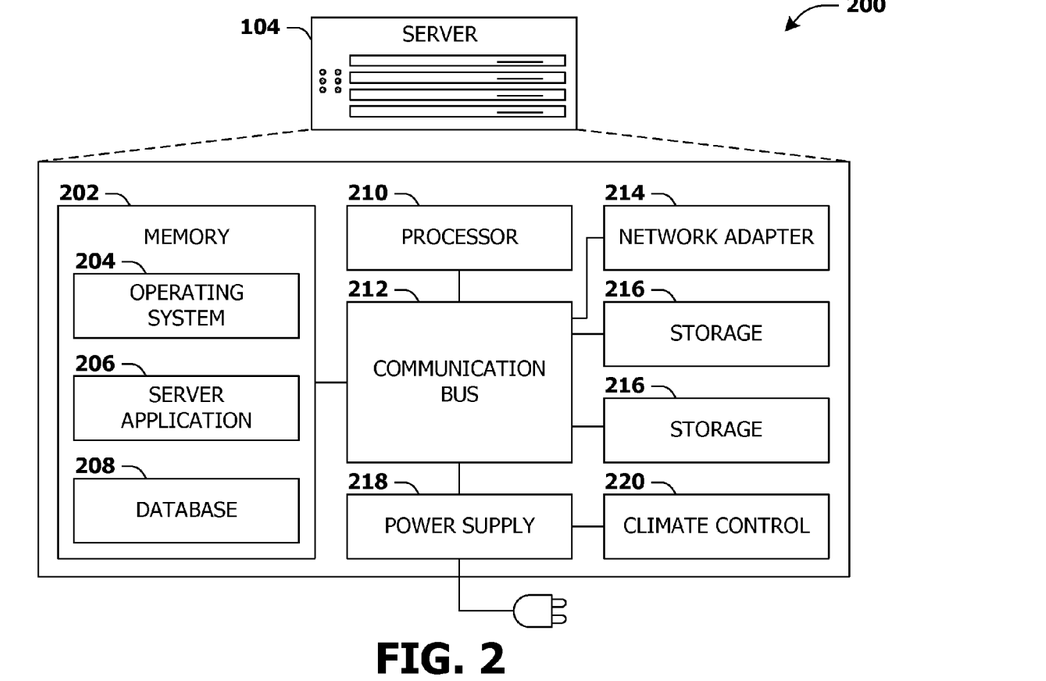
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
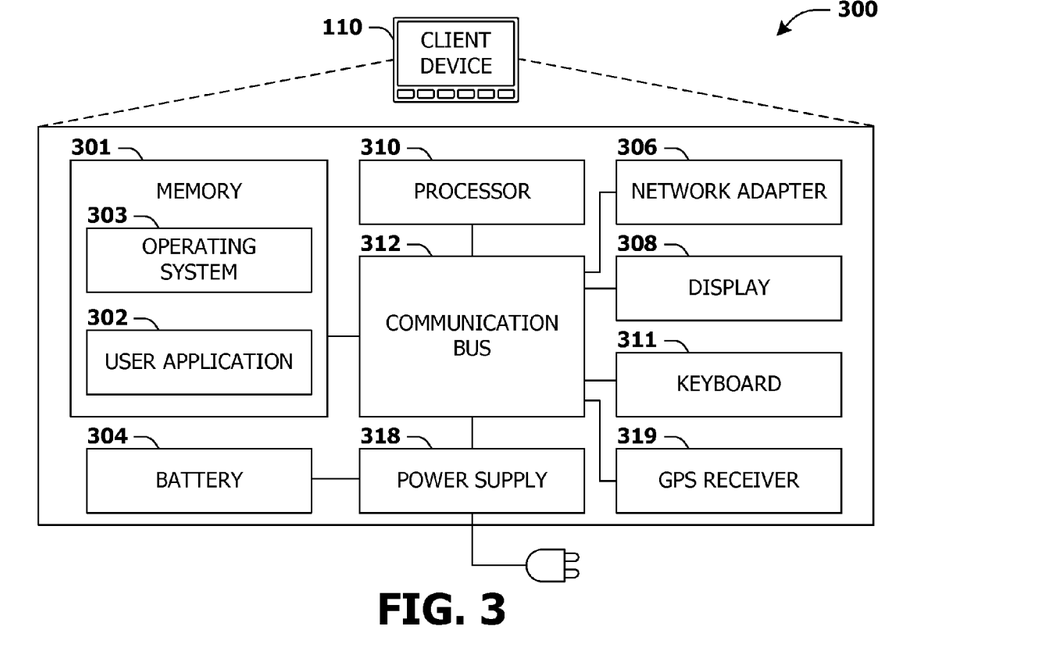
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for webpage navigation utilizing audio signals are provided. A user of a client device may generate an audio signal to navigate within a webpage (e.g., a webmail webpage). The audio signal may be evaluated in a context of the webpage (e.g., the audio signal may be evaluated in the context of the webmail webpage) utilizing a dictionary to identify an audio command. The dictionary may comprise one or more audio signals corresponding to the audio command. For example, the audio signal (e.g., "compose email to Mark," "new email to Mark," "contact Mark," etc.) may be translated into the audio command "generate new email addressed to Mark." The dictionary may comprise generic audio signals corresponding to one or more audio commands (e.g., "undo," "go back," "refresh page," etc.). Responsive to the webpage comprising an element not comprised in the dictionary, an extension dictionary may be generated. The extension dictionary may be generated by parsing the webpage to identify one or more elements on the webpage. For example, the webpage may comprise a surfboard sales webpage. The one or more elements may comprise a buy a first surfboard option, a buy a wakeboard option, etc. The extension dictionary may generate one or more audio commands paired to one or more audio signals (e.g., "buy first surfboard" may be paired to the audio command "put first surfboard in cart and direct user to a checkout webpage"). Once generated for a specific webpage or webpage type, the extension dictionary may be reused when the user navigates to the specific webpage or a webpage having the webpage type.

The audio command may be translated into a text command (e.g., a script corresponding to a script action, such as Java script). The text command may be utilized to invoke an event for the webpage (e.g., an event corresponding to generating an email to Mark, presenting the user with a checkout page comprising the first surfboard, etc.). Thus, the user may navigate through one or more webpages utilizing merely audio signals. The ability to navigate through one or more webpages utilizing audio signals may improve user interaction with a computing device (e.g., a new type of user input for webpage access), such as providing impaired users with the ability to access content that may otherwise be inaccessible through physical input (e.g., a user may have arthritis and/or may have trouble typing and using a mouse).

Figure 4:
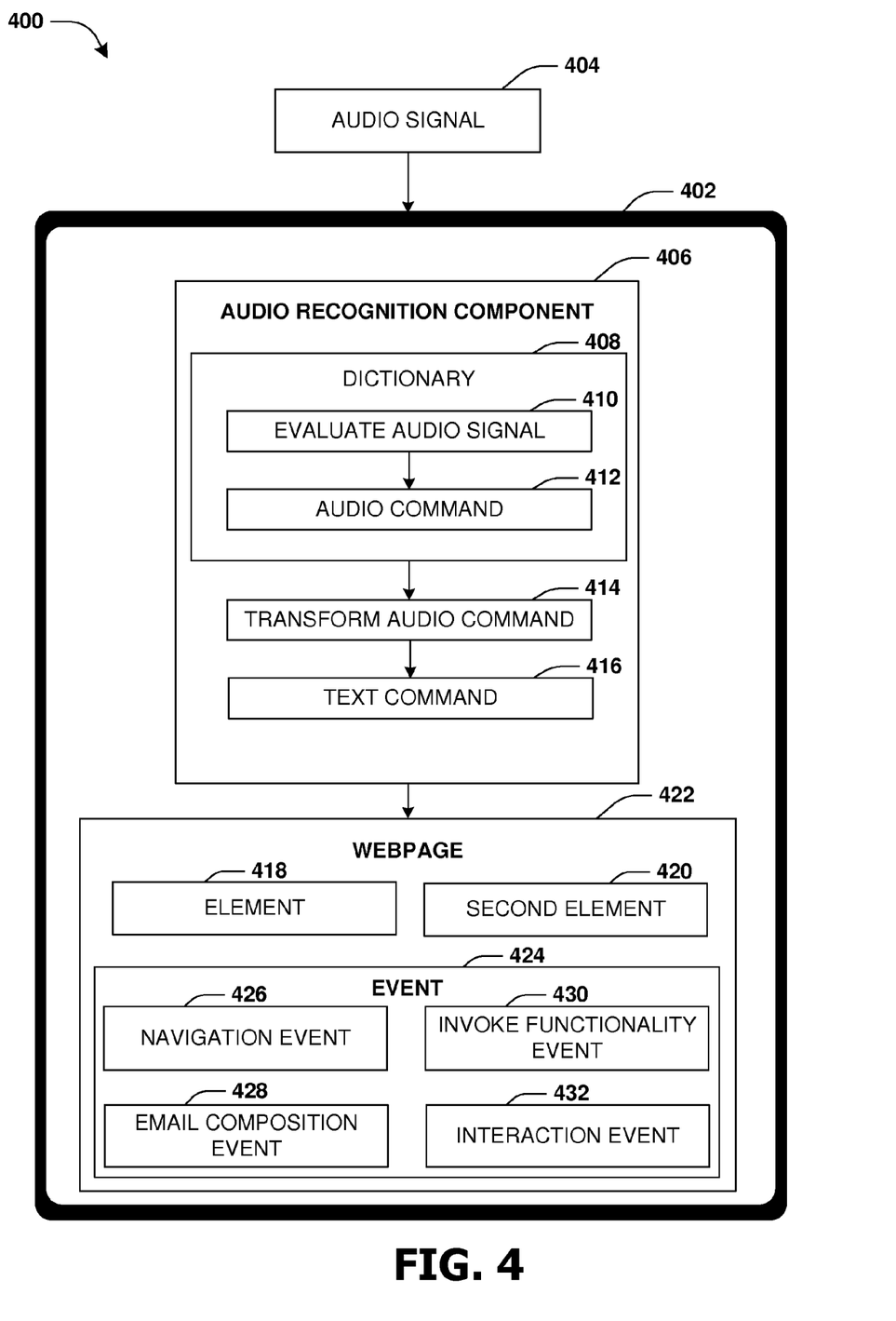
FIG. 4 is a component block diagram illustrating an example system for webpage navigation utilizing an audio signal, where an audio signal is translated into an event on a webpage.

FIG. 4 illustrates an example system 400 for navigation of a webpage 422 utilizing an audio signal 404. A user, of a client device 402, may navigate to the webpage 422 (e.g., utilizing a browser). The user may utilize a navigation audio signal (e.g., "go to webpage") to navigate to the webpage 422. The user may view the webpage 404 and generate the audio signal 404 (e.g., "go to element") based upon the user desiring to interact with an element 418. In an example, responsive to the webpage 422 comprising a social network webpage, the element 418 may comprise a send message option, a view photo option, a search for social network member option, and/or other functionality accessible through a user interface element comprising element 418. An audio recognition component 406 may receive the audio signal 404 (e.g., utilizing a browser speech recognizer).

The audio signal 404 may be evaluated utilizing a dictionary 408. The dictionary 408 may comprise generic audio signals paired to generic commands (e.g., the generic audio signals may comprise "go back," "undo," "refresh page," "go to x," "search for x," "view x," etc. where x is a variable to be defined as an element of the webpage 422). The dictionary 408 may comprise a subtype of dictionary, such as a webmail dictionary based upon the webpage being identified as a webmail webpage (e.g., comprising audio signals "compose new email," "add new contact," etc.), a shopping dictionary based upon the webpage being identified as a shopping webpage (e.g., comprising audio signals "checkout," "select payment type," etc.), a social media dictionary based upon the webpage being identified as the social media webpage (e.g., comprising audio signals "send message," "view profile," etc.), etc. In an example, a large and/or popular webpage and/or website may have a subtype dictionary that is specific to the large and/or popular webpage and/or website (e.g., a subtype dictionary may be tailored towards user interface elements and/or functionality of a well-known social network website). The audio recognition component 406 may parse the webpage 422 to identify one or more elements (e.g., the element 418, a second element 420, etc.). The webpage may be parsed utilizing webpage analysis (e.g., document object model (DOM) analysis) to generate a map (e.g., a DOM map) of the one or more elements on the webpage 422. The audio recognition component 406 may interact with a web application hosted by the webpage 422 to perform the analysis. The analysis may be performed before the webpage 422 is rendered, while the webpage 422 is being rendered, or after the webpage 422 has been rendered. The user may specify when the analysis is performed. For example, the webpage 422 may be rendered more quickly responsive to the analysis being performed after the webpage 422 is rendered. An extension dictionary may be generated, based upon the map, that is specific to the webpage 422. Known elements (e.g., folders in a webmail webpage) may not be parsed.

The dictionary 408 may comprise a translation of the audio signal 404 into an audio command 412. The dictionary 408 may pair the audio signal 404 to the audio command 412 utilizing logic (e.g., fuzzy logic). One or more audio signals may correspond to the audio command 412. For example, if the webpage 422 comprises the webmail webpage, then audio signals "get new email," "check email," "refresh email," etc. may correspond to the audio command 412 for sending and receiving email. The audio command 412 may be translated into a text command 416. The text command 416 may comprise a script (e.g., a Java script) corresponding to a script action. The text command 416 may invoke an event 424 on the webpage 422 (e.g., a script command to invoke the element 418, such as a send/receive email button, to perform a send/receive email event). The event 424 may comprise a navigation event 426 (e.g., directing the user to a second webpage), a email composition event 428 (e.g., presenting the user with a new email), an invoke functionality event 430 (e.g., the user may utilize a function of the webpage 422, such as a scroll function), an interaction with a user interface element of the webpage 422 event 432 (e.g., selecting the element 418 on the webpage 422).

Figure 5:
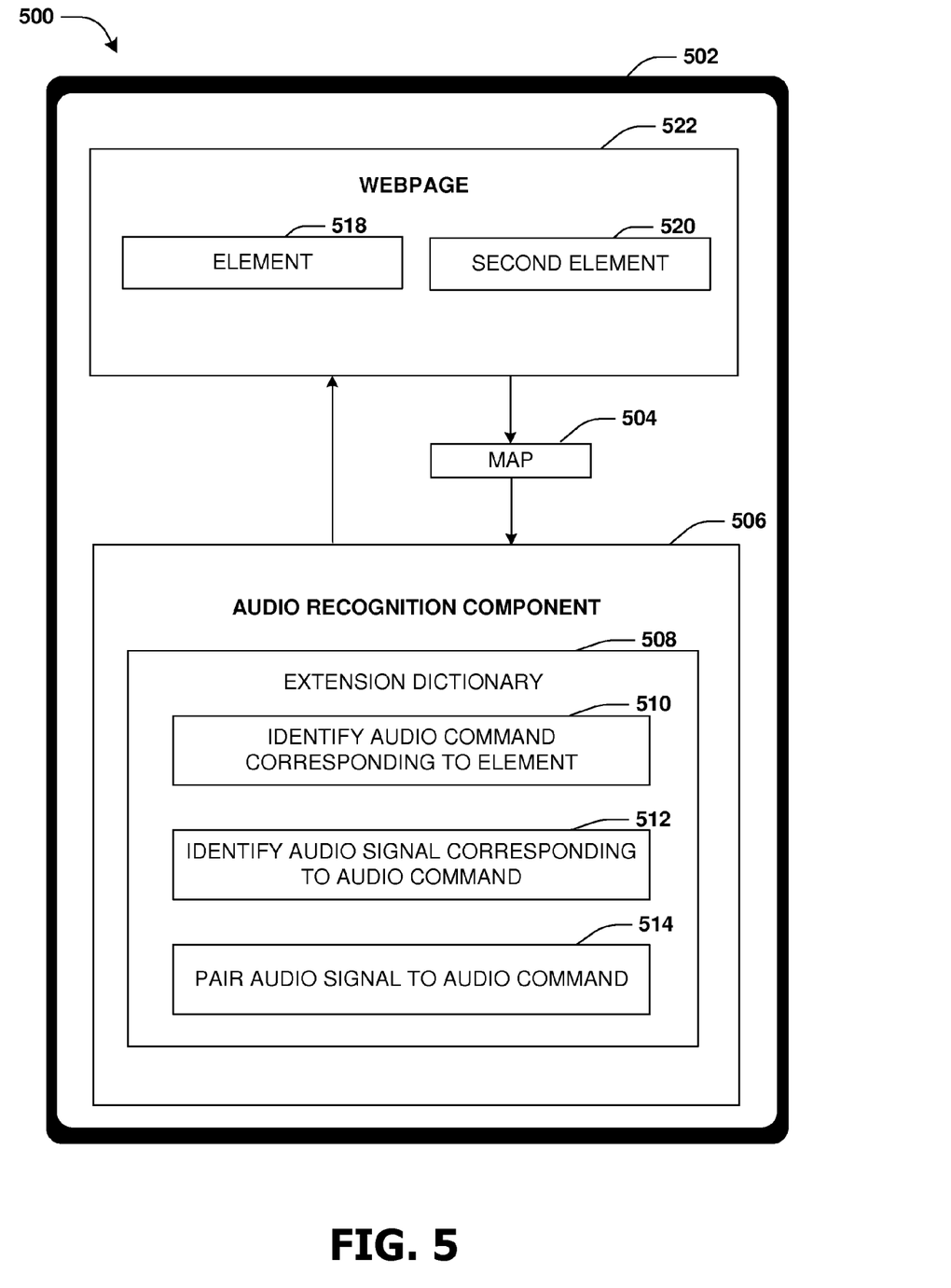
FIG. 5 is a component block diagram illustrating an example system for webpage navigation utilizing an audio signal, where a map is utilized to generate an extension dictionary.

FIG. 5 illustrates an example system 500 for generating an extension dictionary 508. A user, of a client device 502, may navigate to a webpage 522. The webpage 522 may comprise an element 518 and a second element 520. An audio recognition component 506 may generate a map 504 of the webpage 522. The map 504 may comprise the element 518 and the second element 520. The audio recognition component 506 may generate the extension dictionary 508 for the webpage 522. The audio recognition component 506 may identify an audio command 510 corresponding to the element 518 (e.g., the audio command 510 may comprise an instruction to invoke the element 518) and/or a second audio command corresponding to the second element 520 (e.g., an audio command comprising an instruction to invoke the second element 520). For example, responsive to the webpage 522 comprising a shopping webpage, the element 518 may comprise an option to purchase a product and the second element 520 may comprise an option to view additional details about the product.

The audio recognition component 506 may identify an audio signal 512 corresponding to the audio command 510. For example, responsive to the audio command 510 comprising an instruction to move the product into a cart and present the user with a checkout webpage (e.g., utilizing the option to purchase the product), the audio signal 512 may comprise "buy product," "purchase product," "purchase" (e.g., when the product is alone on the webpage 522), "acquire product," etc. The audio command 510 and the audio signal 512 may be paired 514 to generate an entry in the extension dictionary 508 for the element 518. A second entry in the extension dictionary 508 may be generated for the second element 520 in a same or similar manner.

Figure 6A:
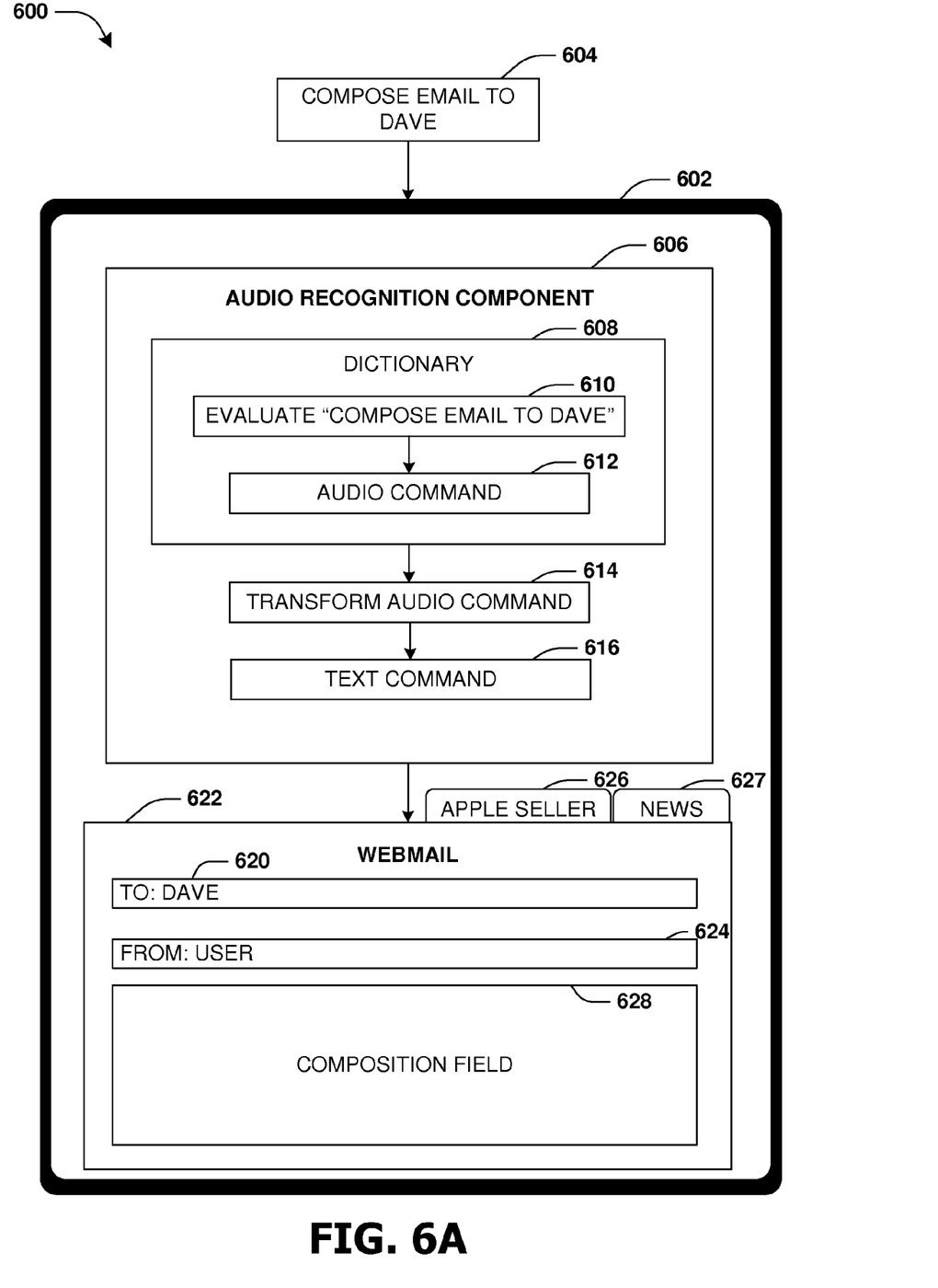
FIG. 6A is a component block diagram illustrating an example system for webpage navigation utilizing an audio signal, where a webpage comprises a webmail webpage.
Figure 6B:
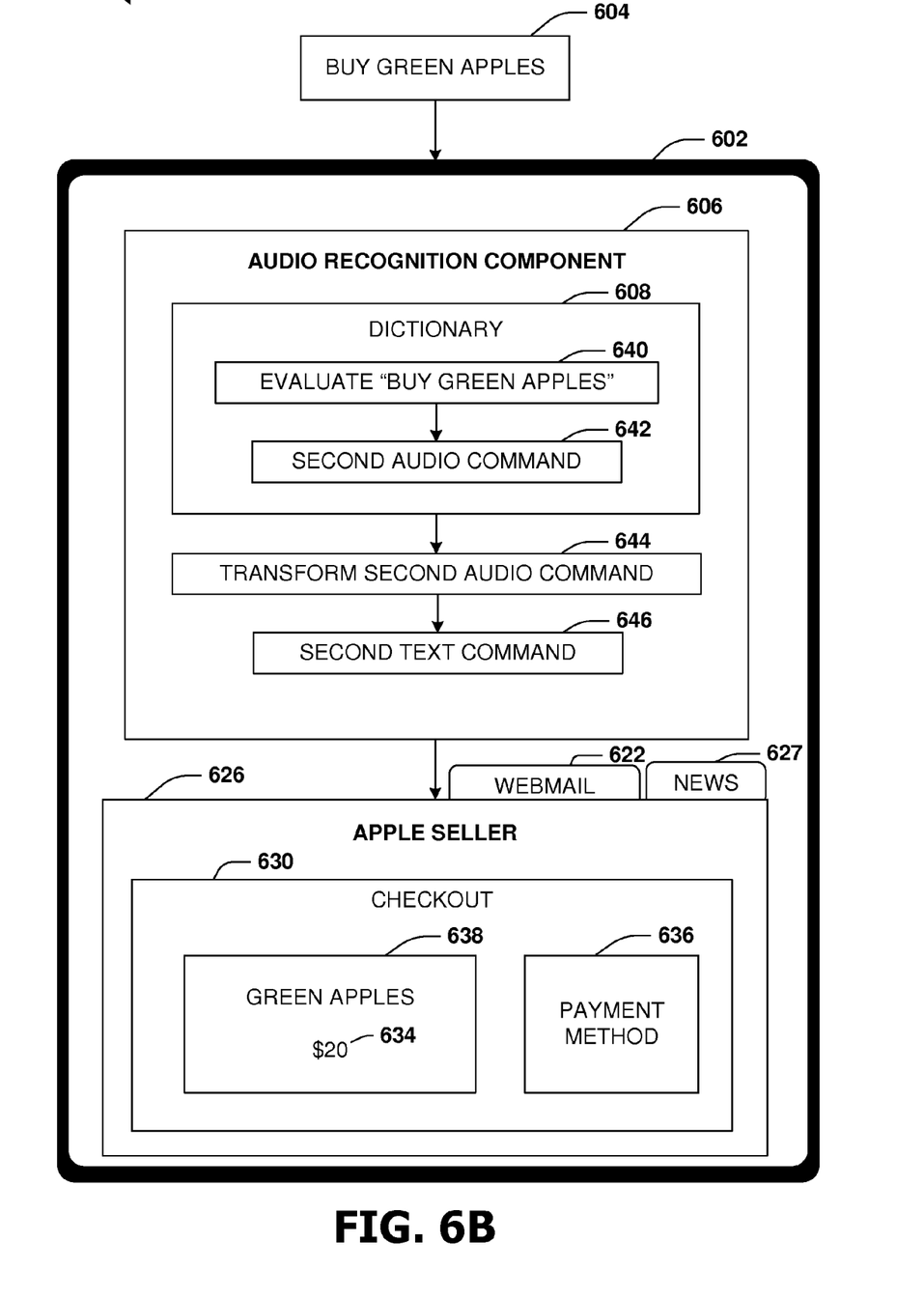
FIG. 6B is a component block diagram illustrating an example system for webpage navigation utilizing a second audio signal, where a second webpage comprises an apple seller webpage.

FIGS. 6A-6B illustrate an example system 600 for navigation of a webpage utilizing an audio signal. A user, of a client device 602, may navigate to three webpages, a webmail webpage 622, an apple seller webpage 626, and a news webpage 627 (e.g., utilizing a browser). The user may view the webmail webpage 622 and generate the audio signal: "compose email to Dave." The audio signal may be evaluated by an audio recognition component 606 utilizing a dictionary 608. The dictionary 608 may comprise the audio signal "compose email to." The dictionary 608 may evaluate "compose email to Dave" and identify an audio command 612 corresponding to the audio signal.

The audio command 612 may comprise an instruction to present a new email on the webmail webpage 622. The audio command 612 may additionally comprise an instruction to search the user's contacts for a Dave. Responsive to a single Dave being present in the user's contacts, Dave may be identified as the user's intended email recipient. In an example, responsive to multiple Daves being present in the user's contacts, the audio command 612 may comprise an instruction to present the user with the new email and an option to select one of the one or more Daves. The audio recognition component 606 may transform 614 the audio command 612 into a text command 616 (e.g., a script). The text command 616 may invoke an event on the webmail webpage 622. For example, the event may comprise presenting the user with the new email addressed to Dave from the user. The new email may comprise a composition field 628 for creating a message to Dave. In another example, the event may comprise presenting the user with the new email and the option to select one of the one or more Daves.

FIG. 6B illustrates the example system 600 for navigation of the webpage utilizing the audio signal. The user may generate a second audio signal: "buy green apples 604." The second audio signal may be evaluated utilizing the dictionary 608. The dictionary 608 may comprise a translation of the "buy green apples 604" into a second audio command 642. The dictionary 608, having parsed the webmail webpage 622 may determine that "buy green apples 604" and/or the second audio command 642 does not make contextual sense for the webmail webpage 622.

In an example, the audio recognition component 606 may present the user with a notification that "buy green apples 604" was not found on the webmail webpage 622. In another example, the audio recognition component 606 may determine that "buy green apples 604" makes contextual sense for the apple seller webpage 626 (e.g., the apple seller webpage 626 having been parsed, analyzed, and mapped previously, such as when the apple seller webpage 626 was rendered). Responsive to the apples seller webpage 626 making contextual sense in regards to the second audio signal and/or the second audio command 642, the audio recognition component 606 may identify the apple seller webpage 626 as the webpage the user desires to navigate.

The second audio command 642 may be translated into a second text command 646. The second text command 646 may invoke a second event on the apple seller webpage 626 (e.g., presenting the user with a checkout option 630, where green apples 638 are being purchased). The checkout option 630 may correspond to an element of the apple seller webpage 626 that may not be visible to the user (e.g., a hidden element). For example, the user may typically select green apples 638 by adding the green apples 638 to a cart (e.g., by stating "add green apples to cart") and navigating to a cart webpage (e.g., within an apples selling website hosting the apples seller webpage 626). The user may navigate from the cart webpage to a checkout webpage by selecting the checkout option 630 (e.g., by stating "go to checkout"). In another example, the user may, utilizing the audio signal "buy green apples 604," add the green apples 638 to the cart and go to the checkout option 630 (e.g., invoking a functionality of the apple seller website rather than merely navigating the apple seller webpage 626). Thus, the user may more efficiently navigate the apples seller webpage 626 utilizing the second audio signal (e.g., by navigating directly to the checkout option 630).

In an example, the checkout option 630 may comprise a price 634 of the green apples 638 (e.g., $20), a payment method field 636 (e.g., for a credit card, a debit card, etc.). In an example, the user may view the checkout option 630 and determine that $20 is too expensive for green apples 638. The user may generate a third audio signal "cancel," "undo," etc. Responsive to receiving the third audio signal, the audio recognition component 606 may take the user back to a previous webpage and/or remove the green apples 638 from a shopping cart. Responsive to the user generating a fourth audio signal "go to news," the audio recognition component 606 may present the user with the news webpage 627.

Figure 7:
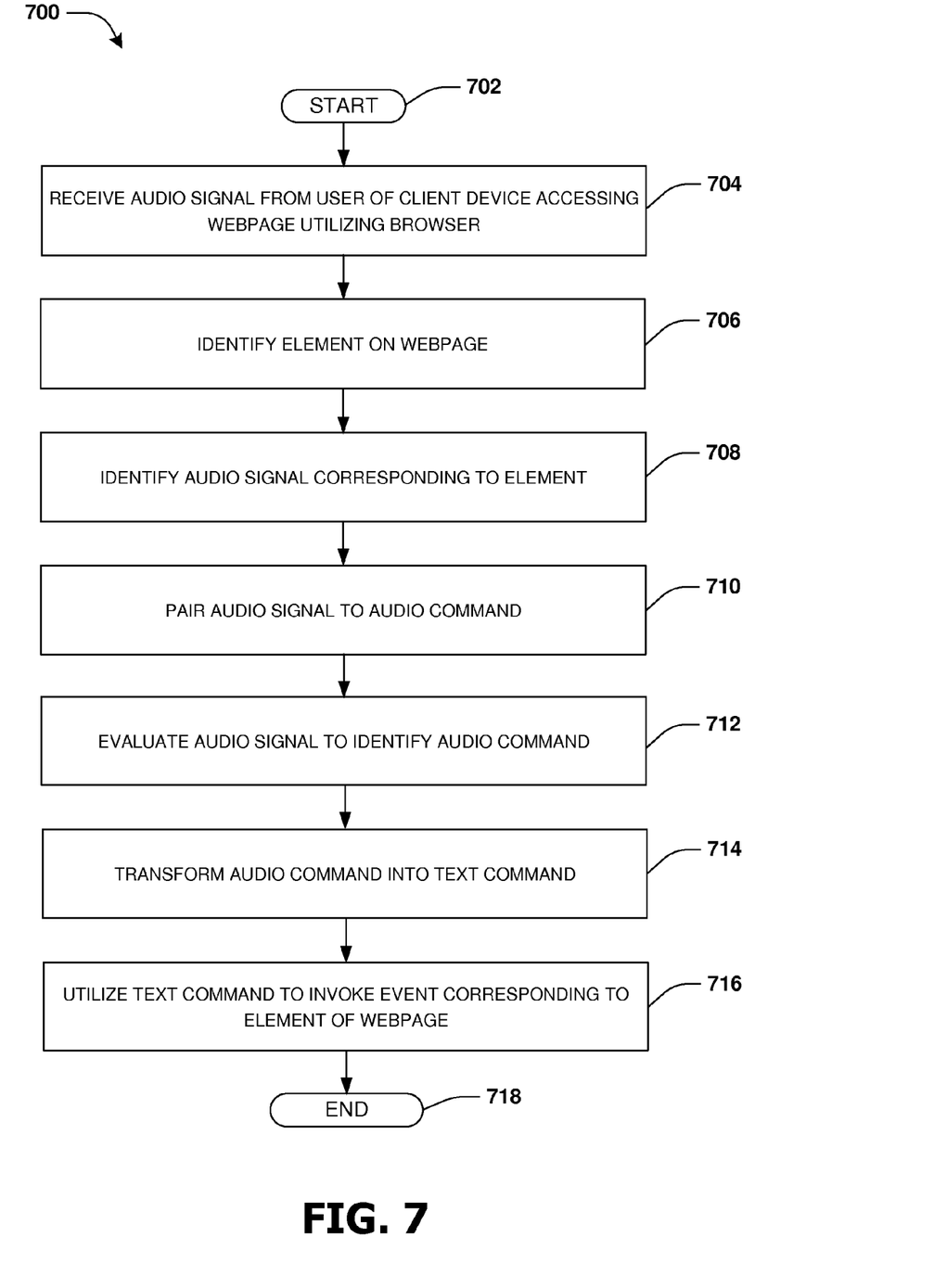
FIG. 7 is a flow chart illustrating an example method of webpage navigation utilizing an audio signal.

An embodiment of webpage navigation utilizing an audio signal is illustrated by an example method 700 of FIG. 7. At 702, the method 700 starts. At 704, the audio signal (e.g., "go to news story A") may be received from a user of a client device accessing a webpage (e.g., a news webpage) utilizing a browser. At 706, an element (e.g., news story A) on the webpage may be identified. At 708, the audio signal may be identified as corresponding to the element. At 710, the audio signal may be paired to an audio command (e.g., navigate to news story A). At 712, the audio signal may be evaluated (e.g., such as by a dictionary comprising one or more audio signal and audio command pairs) to identify the audio command. At 714, the audio command may be transformed into a text command (e.g., a script corresponding to a script action). At 716, the text command may be utilized to invoke an event (e.g., opening news story A and presenting news story A to the user) corresponding to the element of the webpage. At 716, the method 700 ends.

Figure 8:
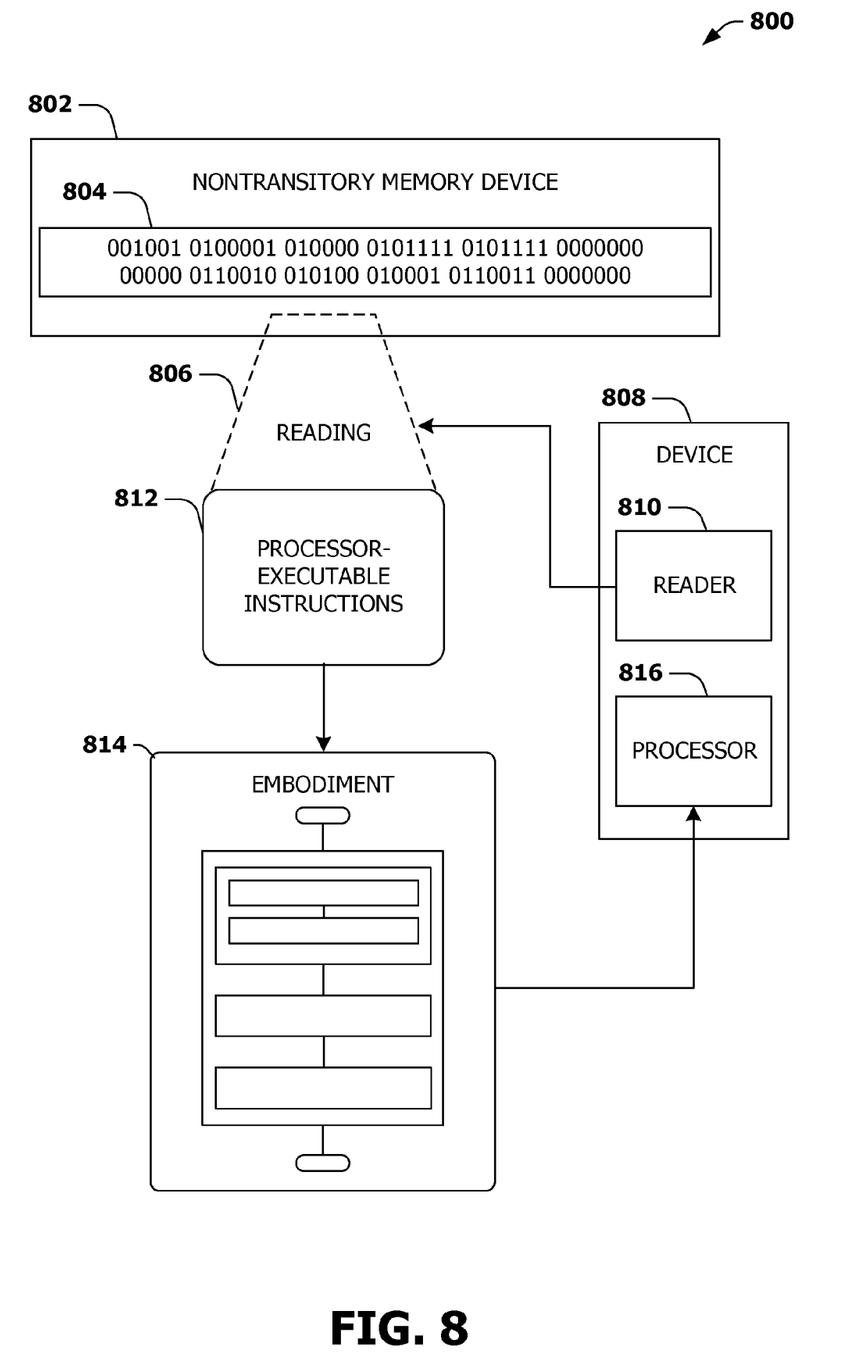
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example 700 of FIG. 7, for example. In some embodiments, the processor-executable instructions, when executed on the processor 816 of the device 808, are configured to implement a system, such as at least some of the example system 400 of FIG. 4, at least some of the example system 500 of FIG. 5, and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A client device for webpage navigation utilizing audio commands, the client device comprising:
   a processor;
   a display; and
   a memory storing instructions that, when executed on the processor, provide a system comprising:
      an audio recognition component comprising one or more dictionaries and configured to:
         receive an audio signal from a user of a client device accessing a webpage utilizing a browser;
         determine a first dictionary to use to evaluate the audio signal;
         responsive to determining that the webpage comprises one or more elements not comprised in the first dictionary and that the webpage is of a first type, generate an extension dictionary for the first type, the generating comprising:
            parsing the webpage to identify a first element and a second element on the webpage;
            pairing a first audio command to a first audio signal corresponding to the first element; and
            pairing a second audio command to a second audio signal corresponding to the second element;
         evaluate the audio signal, comprising a representation of at least one of the first audio signal or the second audio signal, in a context of the webpage utilizing the first dictionary and the extension dictionary for the first type to identify an audio command comprising at least one of the first audio command or the second audio command;
         transform the audio command into a text command;
         utilize the text command to invoke an event for the webpage;
         receive a second audio signal from the user accessing a second webpage utilizing the browser; and
         responsive to determining that the second webpage is of the first type, evaluate the second audio signal utilizing the extension dictionary for the first type.

2. The client device of claim 1, the audio recognition component configured to:
   evaluate the audio signal utilizing the first dictionary to map the audio signal to the audio command.

3. The client device of claim 2, the audio recognition component configured to:
   generate the first dictionary to comprise at least one of:
      a webmail dictionary responsive to the webpage comprising a webmail webpage;
      a shopping dictionary responsive to the webpage comprising a shopping webpage; or
      a social media dictionary responsive to the webpage comprising a social media webpage.

4. The client device of claim 2, the audio recognition component configured to:
   generate the first dictionary to correspond to the context of the webpage.

5. The client device of claim 4, the audio recognition component configured to at least one of:
   generate a map of the webpage, comprising an element of the webpage, before the webpage is rendered;
   generate the map of the webpage while the webpage is rendered; or
   generate the map of the webpage after the webpage is rendered.

6. The client device of claim 5, the audio recognition component configured to:
   generate the extension dictionary utilizing the map.

7. The client device of claim 1, the utilizing the text command comprising:
   invoking a script to perform a script action in the context of the webpage.

8. The client device of claim 1, the event comprising at least one of:
   a navigation event;
   an email composition event;
   an invoke functionality event; or
   an interaction with a user interface element of the webpage event.

9. The client device of claim 1, the audio recognition component configured to:
   interact with a web application hosted by the webpage.

10. The client device of claim 1, the audio recognition component configured to:
    utilize a browser speech recognizer to receive the audio signal.

11. The client device of claim 1, the audio recognition component configured to:
    identify an element on the webpage;
    identify one or more audio signals corresponding to the element; and
    pair the one or more audio signals to the audio command, the audio command transformed into the text command to invoke the event to correspond to the element.

12. The client device of claim 1, the audio recognition component configured to:
    generate a map of the webpage, comprising an element of the webpage, utilizing an accessibility tag, such as an accessibility initiative-accessible rich internet applications tag, associated with the webpage.

13. A method for webpage navigation utilizing audio commands comprising:
    receiving an audio signal from a user of a client device accessing a webpage utilizing a browser;
    identifying an element on the webpage;
    identifying the audio signal corresponding to the element;
    determining a first dictionary to use to evaluate the audio signal;
    responsive to determining that the webpage comprises a second element not comprised in the first dictionary and that the webpage is of a first type, generating an extension dictionary for the first type, the generating comprising:
        pairing a second audio command to a second audio signal corresponding to the second element;
    evaluating the audio signal, comprising a representation of the second audio signal, utilizing the first dictionary and the extension dictionary for the first type to identify an audio command comprising the second audio command;
    transforming the audio command into a text command;
    utilizing the text command to invoke an event corresponding to the element of the webpage;
    receiving a second audio signal from the user accessing a second webpage utilizing the browser; and
    responsive to determining that the second webpage is of the first type, evaluating the second audio signal utilizing the extension dictionary for the first type.

14. The method of claim 13, the evaluating the audio signal comprising:
    utilizing the first dictionary to map the audio signal to the audio command.

15. The method of claim 14, comprising generating the first dictionary to comprise at least one of:
    a webmail dictionary responsive to the webpage comprising a webmail webpage;
    a shopping dictionary responsive to the webpage comprising a shopping webpage; or
    a social media dictionary responsive to the webpage comprising a social media webpage.

16. The method of claim 13, the utilizing the text command comprising:
    invoking a script to perform a script action in the context of the webpage.

17. The method of claim 13, the event comprising at least one of:
    a navigation event;
    an email composition event;
    an invoke functionality event; or
    an interaction with a user interface element of the webpage event.

18. The method of claim 13, comprising:
    utilizing a browser speech recognizer to receive the audio signal.

19. The method of claim 13, comprising:
    evaluating a second audio signal to identify a second audio command;
    transforming the second audio command into a second text command; and
    utilizing the second text command to invoke a second event corresponding to a hidden element, the hidden element corresponding to a functionality of a website hosting the webpage.

20. A non-transitory computer readable medium comprising computer executable instructions that when executed by a processor perform a method for webpage navigation utilizing audio commands, comprising:
    receiving an audio signal, from a user of a client device accessing a webpage utilizing a browser, to select an element of the webpage;
    generating a map of the webpage, the map comprising the element;
    determining a first dictionary to use to evaluate the audio signal;
    responsive to determining that the webpage comprises one or more elements not comprised in the first dictionary and that the webpage is of a first type, generate an extension dictionary for the first type;
    evaluating the audio signal in a context of the webpage utilizing the first dictionary and the extension dictionary to identify an audio command;
    transforming the audio command into a text command;
    utilizing the text command to invoke an event, corresponding to the element, for the webpage;
    receiving a second audio signal from the user accessing a second webpage utilizing the browser; and
    responsive to determining that the second webpage is of the first type, evaluating the second audio signal utilizing the extension dictionary for the first type.

* * * * *